US009660498B2

(12) United States Patent
Truillet et al.

(10) Patent No.: US 9,660,498 B2
(45) Date of Patent: May 23, 2017

(54) MOTOR MOUNT WITH IMPROVED DECOUPLING FOR VENTILATION SYSTEM

(75) Inventors: Franck Truillet, Bu (FR); Olivier Cheriaux, Nogent le Roi (FR); Eric Droulez, Suresnes (FR); Ronan Cozic, Luce (FR); Sebastien Clergeon, Verrieres (FR); Laurent Legot, Paris (FR); Said Naji, Elancourt (FR); Patrick Duputel, Macon (FR); Philippe Vincent, Epernon (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 862 days.

(21) Appl. No.: 13/995,863

(22) PCT Filed: Dec. 8, 2011

(86) PCT No.: PCT/EP2011/072232
§ 371 (c)(1),
(2), (4) Date: Mar. 4, 2014

(87) PCT Pub. No.: WO2012/084538
PCT Pub. Date: Jun. 28, 2012

(65) Prior Publication Data
US 2014/0175926 A1    Jun. 26, 2014

(30) Foreign Application Priority Data

Dec. 20, 2010  (FR) ..................... 10 04963

(51) Int. Cl.
*H02K 5/24*         (2006.01)
*F04D 25/08*        (2006.01)
*F04D 29/66*        (2006.01)

(52) U.S. Cl.
CPC .............. *H02K 5/24* (2013.01); *F04D 25/08* (2013.01); *F04D 29/668* (2013.01)

(58) Field of Classification Search
CPC .................................. H02K 5/24; H02K 5/26
(Continued)

(56) References Cited

U.S. PATENT DOCUMENTS 3,143,284 A * 8/1964 Lindsjo ................. F04D 29/646
                                                          248/606
5,019,737 A * 5/1991 Bruno ....................... F28F 1/16
                                                           310/52

FOREIGN PATENT DOCUMENTS

FR    2679394 A3    1/1993
FR    2711459 A1    4/1995

OTHER PUBLICATIONS

English language abstract and translation for FR 2679394 extracted from espacenet.com database on Nov. 25, 2013, 4 pages.
(Continued)

*Primary Examiner* — Thomas Truong
(74) *Attorney, Agent, or Firm* — Howard & Howard Attorneys PLLC

(57) ABSTRACT

The invention relates to a mount 2 in which is housed an electric motor 3 which has a shaft 10 extending along a longitudinal axis 13, said motor having a mass equilibrium line 22 transverse to the longitudinal axis 13 and passing through a center of gravity 40 of the electric motor, said mount 2 being connected to the motor 3 by a plurality of decoupling means 20 distributed around the periphery of the motor, characterized in that the longitudinal position D2 with respect to the mount 2 of at least one decoupling means 20 and a dimension D3 of this decoupling means 20 along the longitudinal axis 13 are determined with respect to the mass equilibrium line 22.

14 Claims, 2 Drawing Sheets

Figure 1:
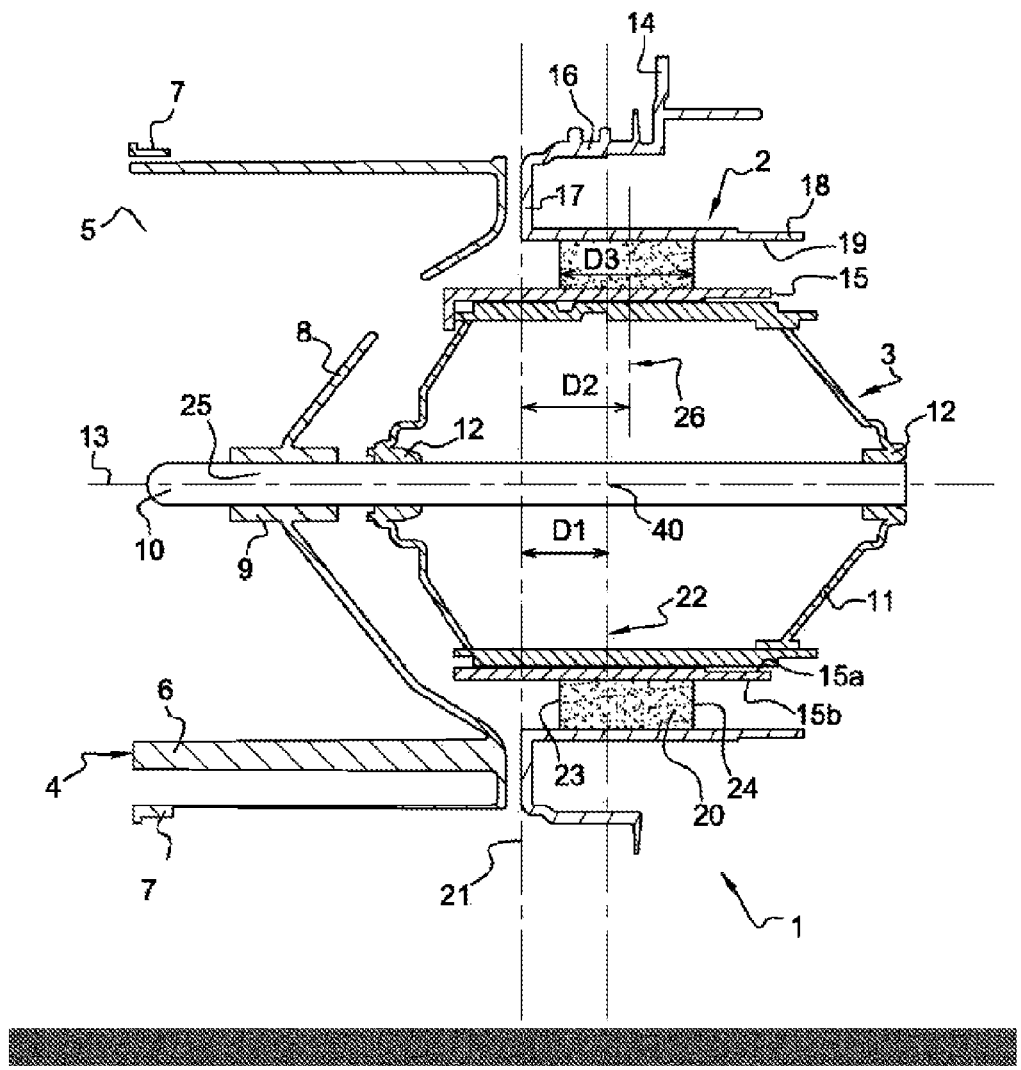

(58) Field of Classification Search
USPC .................................................. 310/51, 89
See application file for complete search history.

(56) References Cited

OTHER PUBLICATIONS

English language abstract and translation for FR 2711459 extracted from espacenet.com database on Nov. 25, 2013, 5 pages.
International Search Report for Application PCT/EP2011/072232 dated Feb. 1, 2013, 7 pages.

* cited by examiner

MOTOR MOUNT WITH IMPROVED DECOUPLING FOR VENTILATION SYSTEM

RELATED APPLICATIONS

This application is the National Stage of International Patent Application No. PCT/EP2011/072232, filed on Dec. 8, 2011, which claims priority to and all the advantages of French Patent Application No. FR 10/04963, filed on Dec. 20, 2010, the content of which is incorporated herein by reference.

The invention relates to the field of mounting devices for the motor of a ventilation, heating and/or air conditioning system for motor vehicles. More particularly, the invention relates to a mounting device comprising a means for decoupling the motor vibrations.

In a ventilation, heating and/or air conditioning system, the air flow circulating therein is propelled by a blower wheel driven in rotation by a motor. The operation of the blower wheel and the motor creates vibrations. Said vibrations cause sound and vibrational disturbances (including unbalance) in the passenger compartment of the vehicle. The vibrations are transmitted via the motor mount to the entire ventilation, heating and/or air conditioning system and create acoustic waves which interfere with the comfort of the passengers of the vehicle.

To remedy this, decoupling means have been arranged between the motor and the motor mount. Said decoupling means are only effective (in terms of vibrations) for a specific frequency band and do not permit the transmission of all vibrations to the ventilation, heating and/or air conditioning system to be prevented. More specifically, when a motor drives a blower wheel, a number of phenomena add up and cause vibrations over the entire frequency range. In the first instance, the unbalance of the wheel causes a radial movement of the motor which has to be avoided. Secondly, a pumping phenomenon due to the suction of air by the blower wheel in addition to the deformation of the wheel causes an axial movement of the motor. Finally, as the motor drives the blower wheel in rotation, a pitching movement or so-called tangential movement of the motor is created.

The problem is accentuated by the fact that the sizes, powers and technologies of the motors vary from one manufacturer to another, thus resulting in a vibro-acoustic signature which is unique to each type of motor. It would be desirable, therefore, for each type of motor to be mounted in a mount appropriate for said signature.

The drawback of such a situation is in the lack of standardization of the mounts which receive each type of motor. Such a wide variety of mounts results in problems of control and logistics which the manufacturers of ventilation and heating systems for motor vehicles would like to reduce.

The invention aims to improve the situation for said manufacturers.

The object of the present invention is thus to remedy the drawbacks described above, essentially by designing a motor mount which achieves a high level of vibrational insulation, able to be used for different types of electric motor by utilizing both the position and the length of the decoupling means in terms of dimensions relative to a plane passing through the center of gravity of the motor, said combination forming a good compromise to cover all types of electric motor currently on the market.

The subject of the invention, therefore, is a mount in which is housed an electric motor which has a shaft extending along a longitudinal axis, said motor having a mass equilibrium line transverse to the longitudinal axis and passing through a center of gravity of the motor, said mount being connected to the motor by a plurality of decoupling means distributed around the periphery of the motor, characterized in that the longitudinal position with respect to the mount of at least one decoupling means and a dimension of said decoupling means along the longitudinal axis are determined with respect to the position of said mass equilibrium line of the motor, in particular with regard to a base constituting the mount. Thus, the length of the decoupling means and the position thereof relative to the mount are calculated relative to the location of the mass equilibrium line of the motor relative to the mount, which makes it possible to guarantee that the same motor mount is effective for several types of electric motor, in particular of different weights. The mass equilibrium line divides the motor into two parts of identical weight.

According to a first feature of the invention, the shaft comprises a zone capable of receiving a turbine, said mount comprising an edge which extends in a plane on the side of said zone relative to the mass equilibrium line, characterized in that the mass equilibrium line and the plane are spaced apart by a value of between 11 and 25 millimeters, advantageously 17 to 25 millimeters.

According to a second feature of the invention, the dimension forms a length of the decoupling means of between 15 and 40 millimeters.

According to a further feature of the invention, the length of the decoupling means is 20 millimeters.

According to a further feature of the invention, a distance along the longitudinal axis which separates the mass equilibrium line and a median plane of the decoupling means is between 0 and 7 millimeters.

According to a further feature of the invention, the median plane extends on the side opposing the zone receiving the turbine relative to the mass equilibrium line.

The distance which separates the median plane and the mass equilibrium line is 7 millimeters.

Advantageously, the mount comprises a plurality of decoupling studs distributed according to a substantially uniform angular offset. When the mount comprises three studs, the angular offset is, for example, equal to 120°.

Further advantageously, the decoupling means connects a base to a ring in which the electric motor is housed, said ring having a first face which extends along the longitudinal axis, said base having a second face which extends along the longitudinal axis, the decoupling means being interposed between the first face and the second face.

According to a variant, the decoupling means has an H-shaped section advantageously in the median plane.

The invention also relates to a motor-blower assembly for a ventilation system of a vehicle comprising a mount as claimed in any one of the preceding features and a turbine mounted on the shaft of the motor.

A primary advantage according to the invention is in the possibility of arranging a more limited number of motor mounts than the number of types of electric motor, the same mount being suitable for several different motors.

A further advantage is in the high level of vibro-acoustic performance, i.e. the reduction of vibrations associated with unbalance and the reduction of noise associated with the motor, achieved by the same motor mount used for a plurality of types of motor.

Figure 2:
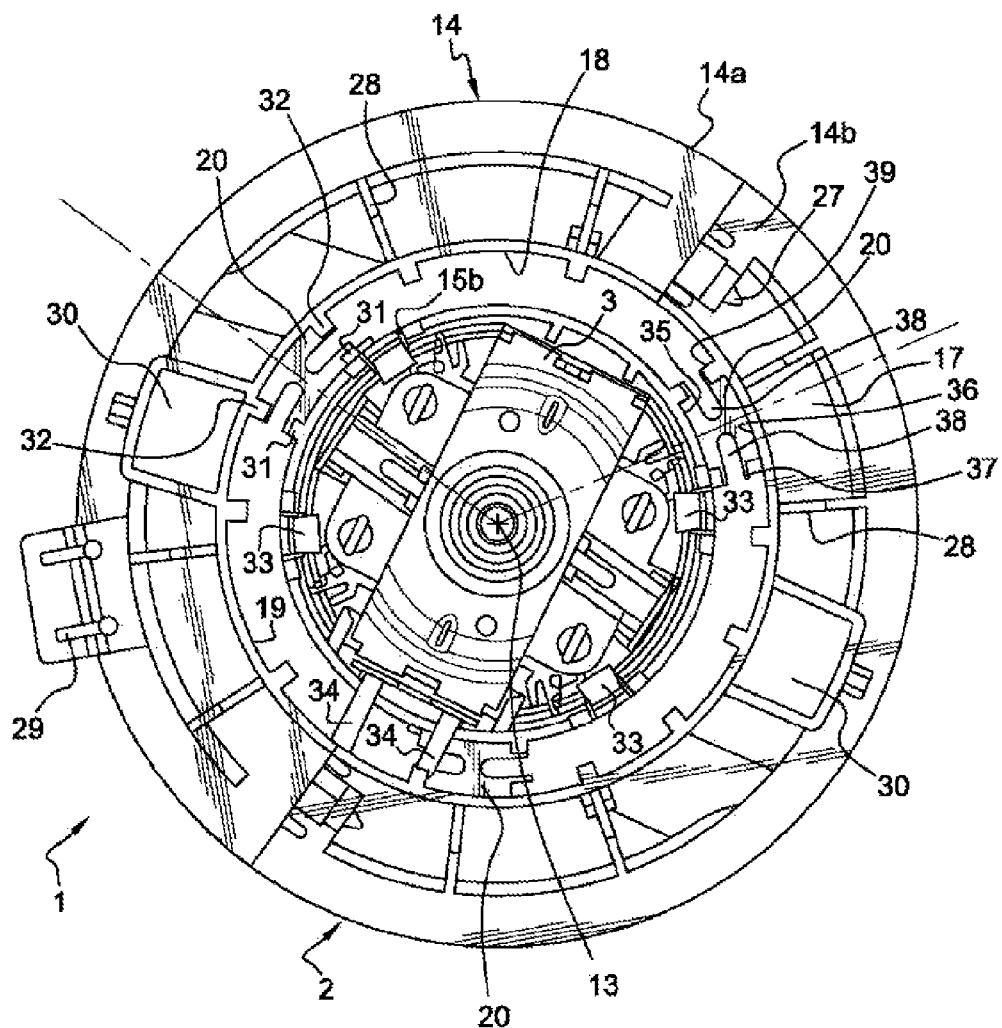

Further features, details and advantages of the invention will emerge more clearly from reading the following description, given by way of indication with reference to the drawings, in which:

FIG. 1 is a sectional view of a motor-blower assembly incorporating the mount and the motor according to the invention, FIG. 2 is a side view of FIG. 1.

It should be noted that the figures reveal the invention in a detailed manner in order to implement the invention, said figures naturally being able to be used to define the invention more clearly if necessary.

FIG. 1 illustrates a motor-blower assembly 1 which comprises a mount 2 housing an electric motor 3. The motor-blower assembly also comprises a blower wheel or turbine 4. Said blower wheel or turbine draws in air via an open face 5 then discharges the air to the side in a direction perpendicular to the air inlet direction through the open face 5.

Said turbine comprises a series of blades 6 joined at the free end thereof by a band 7. Said blades 6 originate from an external peripheral edge of a bowl 8, said bowl being able to be solid or perforated, for example. A hub 9 is provided in the center of said bowl, the function thereof being to connect the turbine 4 mechanically to a shaft 10 forming part of the motor 3.

The electric motor 3 drives the turbine 4 in rotation so as to circulate a flow of air in the ventilation system of the vehicle. The electric motor comprises a cage 11 which defines an internal volume of the motor, said motor comprising components (not shown) such as for example a stator, a rotor and a brush holder and brush assembly.

The motor 3 comprises the shaft 10 which passes through the cage 11 on both sides along an axis 13 denoted the longitudinal axis, defining the length of the motor 3. Said shaft 10 is carried by one or two bearings and/or one or two rolling bearings 12 and/or a combination of a bearing and a rolling bearing, each located at each end of the cage 11. The shaft 10 emerges from one side of the motor to a greater extent than on the other side, thus forming a zone 25 of the shaft 10 which forms the part of the shaft 10 which passes through the hub 9 so as to drive the turbine 4 in rotation.

The mount 2 is manufactured from a plastics material and comprises a base 14 and a ring 15 in which the electric motor 3 is housed.

The ring 15 is defined by an internal wall 15a and by an external wall or first face 15b. The internal wall 15a is turned towards the shaft 10 whilst the first face 15b is turned towards the base 14. Said ring 15 serves as a retaining device for the electric motor 3. Said support is provided in an isostatic manner between the motor 3 and the ring 15, except in the case of the mounting and dismantling phases of the motor relative to the ring 15.

The base 14 forms the element which connects the motor-blower assembly 1 to the ventilation system of the vehicle (not shown). Said base 14 comprises an external peripheral wall 16 from which extends an edge 17. The external peripheral wall 16 is assembled on a blower housing (not shown). An intermediate ring 18 is located opposite the peripheral wall 16 relative to the edge 17, said ring being formed concentrically with the external peripheral wall 16.

The edge 17 extends in a plane perpendicular to the longitudinal axis 13. Said plane is indicated by the reference 21. When the turbine 4 is mounted on the shaft 10, the edge of the turbine, from where the blades 6 originate, is spaced apart from the edge 17 by a value of 3 millimeters.

The base 14 has a second face 19 which extends along the longitudinal axis 13, said second face being turned toward the longitudinal axis. In this embodiment, the second face 19 consists of an internal face of the intermediate ring 18.

A decoupling means 20 is installed between said internal face, or second face 19, of the intermediate ring 18 and an external face of the ring 15, known as the first face 15b. The vibrations generated by the electric motor 3 are thus damped by the decoupling means and thus highly attenuated so as to be hardly perceptible on the base 14.

The electric motor 3 is divided by a line referenced 22 transverse to the longitudinal axis 13 and which passes through a center of gravity of the electric motor 3, referenced in this figure as 40. Said line 22, known as the mass equilibrium line, passes through a plane which divides the electric motor 3 into two parts of equal weight. The mass equilibrium line may be described in a plane perpendicular to the longitudinal axis 13 passing through the center of gravity 40.

The variability of the type of electric motor means that said motors have to be installed in the mount in different ways. This difference is manifested, in particular, in the positioning of the mass equilibrium line 22 of the motor relative to the plane 21 which passes through the edge 17. This positioning, in this case a distance along the longitudinal axis 13, is indicated in this figure by the reference D1.

Electric motors of low weight, for example of less than 1000 g, are installed in the motor mount 2 such that their mass equilibrium line 22 is located at a distance of between 11 and 18 millimeters from the plane 21. Electric motors of intermediate weight, i.e. between 1000 g and 1100 g, are installed in the motor mount 2 such that their mass equilibrium line 22 is at a distance of between 14 and 22 millimeters from the plane 21. Electric motors of high weight, i.e. above 1100 g, are installed in the motor mount 2 such that their mass equilibrium line 22 is at a distance of between 17 and 25 millimeters from the plane 21.

It goes without saying that the invention permits the specific choice to be made for positioning electric motors in the mount such that the distance D1 which separates their mass equilibrium line 22 relative to the plane 21 is between 11 and 25 millimeters and may be of any value in this range, as a function of the weight of the motor.

The decoupling means 20 has a first end 23 on the side of the zone 25 of the shaft 10 which receives the turbine 10 and a second end 24 opposing the first end 23 relative to the stud forming a decoupling means. Said two ends 23 and 24 characterize a dimension of the decoupling means 20 in a direction parallel to the longitudinal axis 13. In the present case, this distance forms a length of the decoupling means 20, referenced D3 on FIG. 1.

This length D3 may, therefore, be between 15 and 40 millimeters.

In a more detailed manner, when the mass equilibrium line 22 of the electric motor 3 is located 17 millimeters or less from the plane 21, the length D3 of the decoupling means 20 is between 15 millimeters and 25 millimeters. When the mass equilibrium line 22 of the electric motor 3 is located between 17 and 22 millimeters from the plane 21, the length D3 of the decoupling means 20 is between 18 millimeters and 32 millimeters, and when the mass equilibrium line 22 of the electric motor 3 is located more than 22 millimeters from the plane 21, the length D3 of the decoupling means 20 is between 23 millimeters and 40 millimeters. Naturally, the invention is not limited to said three examples and the length D3 of the decoupling means 20 may be of any value in this range, as a function of the distance D1.

In other words, the length D3 of the decoupling means is relative to a function of the distance D1, i.e. the distance which separates the plane 21 of the mass equilibrium line 22 passing through the center of gravity 40.

The position of the decoupling means 20 relative to the mount 2 is also significant for the invention. The decoupling means 20 has a median plane perpendicular to the longitudinal axis 13 and this median plane defines the position along the longitudinal axis 13 of the decoupling means 20 relative to the mount 2. This median plane, referenced 26, separates in a virtual manner the length of the decoupling means 20 into two parts of identical length.

The determination of the distance D2 of the decoupling means is associated with the position of the mass equilibrium line 22, defined by the distance D1. This distance D2 thus varies as a function of the weight of the motor, since the distance D1 is a function of the weight of the motor.

As a function of the motor used, the median plane 26 may be located on either side of the mass equilibrium line 22, i.e. on the side of the zone 25 for receiving the turbine 4 or the other side of the motor relative to the mass equilibrium line 22.

Varying the position of the decoupling means results in positioning the median plane 26 at a distance of between 0 and 7 millimeters from the mass equilibrium line 22, i.e. at a maximum of 7 millimeters on one side of the mass equilibrium line, or 7 millimeters on the other side of the mass equilibrium line. The extent of this range of values is thus equal to 14 millimeters. Taking a different reference value, the median plane 26 is spaced apart from the plane 21 passing through the edge 17 by a value D2 of between 4 and 32 millimeters.

However, it will be noted that a position of the median plane 26 on the side opposing the zone 25 relative to the mass equilibrium line 22 is advantageous as it provides satisfactory vibro-acoustic performance for a large range of electric motors of different types.

More specifically, the median plane 26 is between 0 (zero) and 5 millimeters from the mass equilibrium line 22 when it is between 11 and 18 millimeters from the plane 21.

When the mass equilibrium line 22 is spaced apart from the plane 21 by a value of between 14 and 22 millimeters, then the median plane 26 is spaced apart from the mass equilibrium line 22 by a value of between 2 and 6 millimeters.

Finally, when the mass equilibrium line 22 is spaced apart from the plane 21 by a value of between 17 and 25 millimeters, the median plane 26 is then spaced apart from the mass equilibrium line 22 by a value of between 3 and 7 millimeters.

It will thus be understood from the above that the longitudinal position relative to the mount of the decoupling means, in addition to a dimension of said decoupling means along the longitudinal axis, in particular its length, are determined relative to the position of the mass equilibrium line of the motor versus the mount. The invention thus relates to a specific relation between the position and the length of the decoupling means 20 and the position of the mass equilibrium line of the electric motor, in other words the weight of the motor.

In an improvement of the invention, a parameter of the service life of the decoupling means 20 may also be taken into consideration to determine the length of said means, without significantly reducing the performance in terms of vibrational insulation. To extend its service life, the decoupling means may have a rigidity obtained either by extending the decoupling means or by increasing the thickness, or by changing the physical characteristics of the material, more than that strictly required by the determination associated with the position of the mass equilibrium line.

FIG. 2 illustrates the motor-blower assembly viewed from the left-hand side of FIG. 1, i.e. from the side of the turbine, said turbine being omitted from FIG. 2.

The base 14 has a circular shape consisting of two semi-circular sub-assemblies 14a and 14b which are joined face to face and which have counter-shapes 27 ensuring the centering of one sub-assembly relative to the other.

The edge 17 supports reinforcing ribs 28 distributed peripherally over the edge and which extend in a plane parallel to the longitudinal axis 13. The edge 17 also comprises two recesses 30 opposing one another relative to the longitudinal axis 13. The peripheral external wall 16 comprises a protuberance 29 which forms a stop for mounting the mount 2 on the blower housing of the ventilation system. The intermediate ring 18 forms, in turn, a tube of circular section which is open at each of its ends.

It will be noted that the peripheral wall 16, the intermediate ring 18 and the ring 15 are of tubular shape and installed concentrically.

The base 14 is connected to the ring 15 by three decoupling means 20 which are installed so as to form an angle $\alpha$ of 120° between each decoupling means 20. Said decoupling means is mounted in a housing on the first face 15b, said housing being delimited by grooves 31. Said decoupling means is also fixed to the second face 19, for example by overmolding in a housing bordered by ribs 32.

In a plane perpendicular to the longitudinal axis 13, the section of the decoupling means 20 forms an H-shape. Said decoupling means 20 is a parallelepipedal stud, comprising a first side 35 in direct contact with the ring 15 of the motor mount, in particular by adhesive bonding, clipping or overmolding on the first face 15b.

The decoupling means comprises a second side 36 in direct contact with the intermediate ring 18 of the motor mount and a third free side 37 extending parallel to the longitudinal axis 13 of the electric motor 3. The third side 37 has at least one recess 38 extending in a direction parallel to the longitudinal axis 13.

The decoupling means 20 comprises a fourth side 39, also having at least one recess 38.

The width of the decoupling means is the distance measured between a base of the recess 38 formed in the third side 37 and a base of the recess 38 formed in the fourth side 39. Said width is advantageously between 3 and 5 millimeters.

The specific structure of the decoupling means ensures the vibrational insulation between the electric motor 3 and the mount 2 whatever the type of vibrations caused by the use of the motor and the blower wheel. Thus vibrations of the axial type and tangential type are absorbed by the decoupling means 20. The recess 38 created in a direction parallel to the longitudinal axis 13 confers a flexibility to the flexible stud relative to axial stress and relative to tangential stress, whilst preserving the rigidity of the stud relative to radial stress. Such a shape of the decoupling means 20 combined with a longitudinal positioning and a length determined according to the invention provide a mount 2 which is very efficient in terms of vibrational insulation for a plurality of different types of electric motor.

The electric motor 3 is held in the internal volume of the ring 15 which forms a tube which is open at each end. The displacement of the electric motor along the longitudinal axis 13 is blocked by stops 33 made by molding with the ring 15 in the region of a section forming one of the ends of the ring 15.

The motor 3 is supplied with electricity from outside the mount 2 by two conductors 34.

The invention described above relates to the positioning and the length of at least one decoupling means 20 from three decoupling means offset at an angle of 120°. It goes without saying that the invention also relates to the case where a plurality of decoupling means is installed according to the subject of claim 1.

The invention claimed is:

1. A mount (2) in which is housed an electric motor (3) which has a shaft (10) extending along a longitudinal axis (13), the motor (3) having a mass equilibrium line (22) transverse to the longitudinal axis (13) and passing through a center of gravity (40) of the motor (3), the mount (2) being connected to the motor (3) by a plurality of decoupling means (20) distributed around the periphery of the motor (3), wherein a longitudinal position (D2) with respect to the mount (2) of at least one decoupling means (20) and a dimension (D3) of the decoupling means (20) along the longitudinal axis (13) are determined with respect to the mass equilibrium line (22), in which the shaft (10) comprises a zone (25) for receiving a turbine (4), the mount (2) comprising an edge (17) which extends in a plane (21) on a side of the zone (25) relative to the mass equilibrium line (22), wherein a median plane (26) extends on a side opposing the zone (25) relative to the mass equilibrium line (22), and wherein the median plane (26) is a plane which divides the decoupling means (20) into two portions having a same length.

2. The mount (2) as claimed in claim 1, wherein the mass equilibrium line (22) and the plane (21) are spaced apart by a value (D1) of between 11 and 25 millimeters.

3. The mount (2) as claimed in claim 2, in which the dimension (D3) forms a length of the decoupling means (20) of between 15 and 40 millimeters.

4. The mount (2) as claimed in claim 2, in which a distance along the longitudinal axis (13) which separates the mass equilibrium line (22) and a median plane (26) from the decoupling means (20) is between 0 and 7 millimeters.

5. The mount (2) as claimed in claim 2, in which the decoupling means (20) connects a base (14) to a ring (15) in which the motor (3) is housed, the ring (15) having a first face (15b) which extends along the longitudinal axis (13), the base (14) having a second face (19) which extends along the longitudinal axis (13), the decoupling means (20) being interposed between the first face (15b) and the second face (19).

6. The mount (2) as claimed in claim 1, in which the dimension (D3) forms a length of the decoupling means (20) of between 15 and 40 millimeters.

7. The mount (2) as claimed in claim 6, in which a distance along the longitudinal axis (13) which separates the mass equilibrium line (22) and a median plane (26) from the decoupling means (20) is between 0 and 7 millimeters.

8. The mount (2) as claimed in claim 1, in which a length of the decoupling means (20) is 20 millimeters.

9. The mount (2) as claimed in claim 1, in which a distance along the longitudinal axis (13) which separates the mass equilibrium line (22) and the median plane (26) from the decoupling means (20) is between 0 and 7 millimeters.

10. The mount (2) as claimed in claim 1, in which the distance which separates the median plane (26) and the mass equilibrium line (22) is 7 millimeters.

11. The mount (2) as claimed in claim 1, comprising three decoupling means (20) distributed over an angular offset of 120°.

12. The mount (2) as claimed in claim 1, in which the decoupling means (20) connects a base (14) to a ring (15) in which the motor (3) is housed, the ring (15) having a first face (15b) which extends along the longitudinal axis (13), the base (14) having a second face (19) which extends along the longitudinal axis (13), the decoupling means (20) being interposed between the first face (15b) and the second face (19).

13. The mount (2) as claimed in claim 1, in which the decoupling means (20) has an H-shaped section.

14. A motor-blower assembly (1) for a ventilation system of a vehicle comprising a mount (2) as claimed in claim 1 and a turbine (4) mounted on the shaft (10) of the motor (3).

* * * * *